United States Patent [19]
Walker

[11] 3,854,911
[45] Dec. 17, 1974

[54] PRESSURE FUEL TANK EVAPORATION CONTROL

[76] Inventor: Brooks Walker, 1280 Columbus Ave., San Francisco, Calif. 94133

[22] Filed: Apr. 13, 1971

[21] Appl. No.: 133,537

[52] U.S. Cl.............. 55/387, 220/44 R, 220/85 VS
[51] Int. Cl............................................ B01d 53/00
[58] Field of Search............ 55/25, 26, 58, 74, 196, 55/387; 220/24 C, 44 R, 85 VR, 85 VS

[56] References Cited
UNITED STATES PATENTS

| | | | |
|---|---|---|---|
| 2,860,656 | 11/1958 | Eshbaugh.......................... | 220/44 R |
| 3,289,711 | 12/1966 | Hall................................... | 55/387 X |
| 3,352,294 | 11/1967 | Biller et al. ....................... | 55/387 X |
| 3,434,621 | 3/1969 | Previte............................. | 220/44 R |
| 3,543,484 | 12/1970 | Davis................................. | 55/387 |
| 3,617,034 | 11/1971 | Skinner............................ | 220/85 VS |

*Primary Examiner*—Samih N. Zaharna
*Assistant Examiner*—Richard W. Burks
*Attorney, Agent, or Firm*—Everett G. Clements

[57] ABSTRACT

This invention pertains to a method of controlling the evaporation from a carburetor float bowl and from a pressurized fuel tank when the vapor pressure exceeds a predetermined level and a method of relieving the built up vapor pressure in the pressurized tank before removing the cap preparatory to filling the tank, and venting all such fumes to a vapor absorbing canister such as a canister containing activated carbon or an oil saturated crankcase and later when the engine is running to recycle the absorber and draw the fumes to the intake of the engine to burn them in the engine.

7 Claims, 5 Drawing Figures

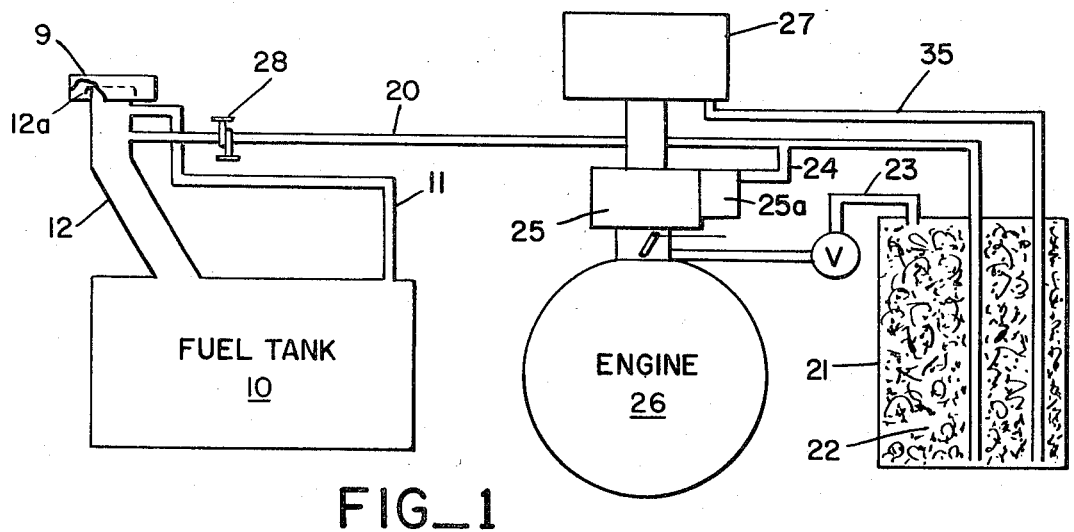
FIG_1
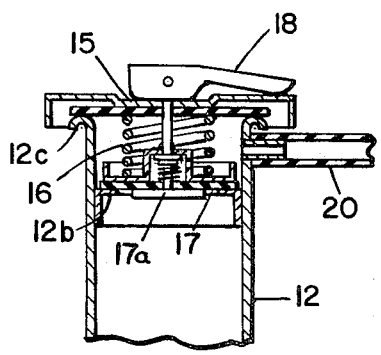
FIG_2
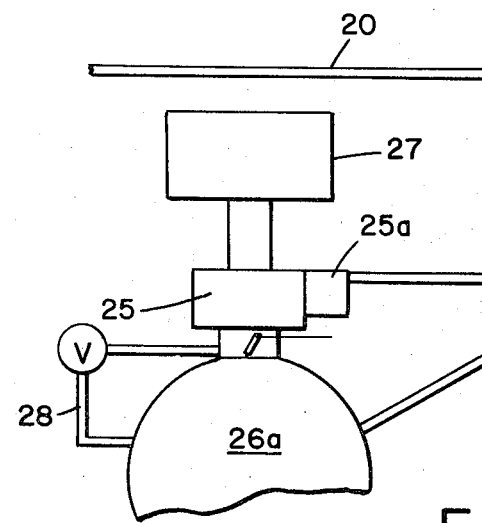
FIG_3
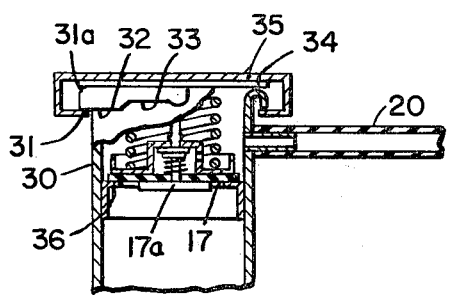
FIG_5
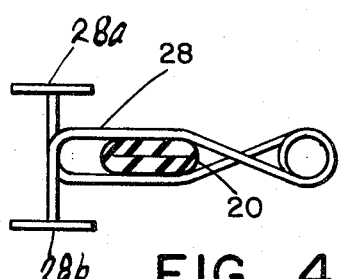
FIG_4
INVENTOR.
BROOKS WALKER
BY
*Brooks Walker*
ATTORNEYS

PRESSURE FUEL TANK EVAPORATION CONTROL

An object of the invention is to provide joint means for absorbing the evaporation from the carburetor float bowl after the engine is stopped and heat from the engine tends to evaporate some or all of the fuel in said float bowl, and arrange to have such absorber also absorb the fumes from a pressure fuel tank which exceeds a predetermined amount or the fumes from the pressurized fuel tank when relieved of such pressure prior to removal of the filler cap for refueling said fuel tank.

Another feature is to vent a pressurized fuel tank so that when tilted the pressurized fumes, not fuel, can be vented to an absorber before removing the cap.

Another object is to provide a fuel tank filler cap and neck somewhat similar to the cap and neck used on pressure radiators whereby a relief lever raises a lower seal to allow the built up fuel vapor pressure to be conveyed to an absorber whether canister containing activated carbon or other suitable absorbent material or to an oil saturated crankcase and then recycle the absorber to draw fresh air through said absorber with the fumes transferred to the intake of the engine to be burned therein and thereby reduce the evaporative emissions to the atmosphere that would add to the smog or pollution in the area.

Pressure tanks for vehicle fuels when in warm or hot weather or when the vehicle is left in the sun or when the heat generated by the motor, radiator, engine exhaust heat, the passing air which then passes and heats the fuel tank and contents and raises the temperature of the fuel tank, developes considerable vapor pressure if confined. Most vehicles use fuel tanks of such flat shapes or with flat sides that are not suitable to be pressurized to the maximum vapor pressure expected from gasoline when confined at temperatures that such tanks can attain in use. Therefore such tanks on new vehicles in the U.S.A. are currently vented to an absorber of such gaseous hydrocarbon vapors, such as a canister of activated carbon or other suitable absorber or to the engine crankcase, both of which are purged with fresh air drawn in by suction from the engine intake when the engine is running. If the vehicle is left standing for a number of days with a large change in temperature during each day and night an absorber may be saturated if the tank is not pressurized the absorber may not be saturated due to the reduced flow to the absorber from a pressurized fuel tank. The evaporation from such a fuel tank will be greatly reduced if the tank of suitable shape is pressurized and only purged above a selected pressure or just before filling. If a pressure cap alone is used, a considerable amount of vapor will be lost to the atmosphere with considerable fire danger when the cap of a pressurized gasoline tank is opened for refueling. This invention allows the pressure to be relieved and the rich HC vapors transferred to the absorber before the cap is removed to prevent such pollution of the air as would result if the fume pressure were allowed to escape to the atmosphere. Also, if the car were tilted so the filler cap was on the low side of a tank that was pressurized and the cap suddenly opened under pressure conditions, gasoline might flow out with considerable force with danger to the cap opener and very great fire danger and excessive air pollution from the fumes and ejected gasoline, unless the fumes from the higher side of the tank were conducted to the filler neck above the fuel level.

Another feature is to use a conventional pressure radiator type cap and neck end for a fuel tank filler neck and cap to avoid having to tool up for a new design when one highly developed is available. Such a cap has a suction check valve in the lower seal element drawing air from the canister to prevent suction damage to the fuel tank.

Other features will be pointed out in the accompanying specification and claims.

I have illustrated my invention by way of example in the accompanying drawings, in which:

FIG. 1 represents one form of the invention in plan view, partly schematic.

FIG. 2 shows an enlarged view of an alternate sectional type fuel filler neck and cap embodying this invention.

FIG. 3 shows a schematic side elevation view of an alternate form of the invention utilizing the crankcase of the engine as a storage for the evaporative vapor from the relieved pressure in the fuel tank and/or carburetor float bowl.

FIG. 4 shows a type of breather hose close off device that could be used.

FIG. 5 shows an alternate type cap and filler neck.

In all figures like numerals show corresponding parts.

In FIGS. 1, 3 and 4 I have shown a pressure resistant fuel tank 10 with a filler neck 12 from one end thereof and a vent line 11 from the other end of tank 10 to a point near the filler cap 9 which is secured to the cam shaped turned down lip 12a in the usual manner. The cap may have a suction operated relief valve to prevent a high suction on said tank 10. A tube 20 extends from filler neck 12 to canister 21 with activated carbon 22 or other suitable absorbent material. Tube 20 can be of plastic of hydrocarbon proof flexible material with a surgical type clamp 28 for closing same, as shown in FIG. 4, until just before the operator wants to refuel the tank whenn he presses the two thumb knobs 28a and 28b to open hose 20 to vent any built-up pressure (i.e. vapor pressure in excess of atmospheric pressure) in tank 10 to absorber canister 21 or to the crankcase 26a, as shown in FIG. 3. Engine 26 is fueled by carburetor 25 with float bowl 25a. A vent line 24 vents fuel vapors from float bowl 25a after a hot engine is stopped to line 20 leading to canister 21. Purge line 23 leads to the engine side of the throttle, not shown, with suitable flow control valve F.V.1 as is common with such purges of carbon canisters or crankcase ventilation to prevent excessive flow at high suction. The air to purge is cleaned by air cleaner 27 and drawn into the canister through line 35. Alternatively, the container may be opened-ended and purge may be admitted from the atmosphere (i.e. line 35 may be omitted.)

In FIG. 2 I have shown a different type filler neck 12 with two sealing areas—the turned down lip 12c of the neck 12 which is sealed by diaphragm seal 15 in cap 19 and lower seal 17 is urged down by spring 16 to seal against seat 12b to a selected release pressure in basically the same way that is common in pressure radiator cap and neck constructions. Vent line 20 instead of just going overboard to get rid of radiator steam gases as when on a radiator, in this invention is conducted by line 20 in one embodiment to absorber canister 21 in FIG. 1 or to the engine crankcase 260, as in FIG. 3. A crankcase vent line 28 with flow control valve FV2 is used for bringing the absorbed fumes in the crankcase to the intake for recycling. The lever 18 of cap 19 when raised lifts valve 17 against spring 16 to allow the built up pressure of vapor in tank 10 to be relieved and conducted to canister 21 in one embodiment or to the crankcase 26a of FIG. 4 depending on the type of absorber used in another embodiment. If this type, shown in FIG. 2, of cap and neck are used, new tooling will not be necessary as such caps aand necks are fully developed for pressure radiator caps. Only different spring 16 pressures would be necessary if different relief pressures for the fuel tanks were desired from those used on radiators. A suction relief valve 172 will draw air and fumes from line 20 and canister 21 to prevent damage to tank 70 by suction. A close off clamp, such as shown in FIGS. 1 and 4 would not be necessary with a cap of the type shown in FIGS. 2 or 5.

In FIG. 5 I have shown a different type of cap 35 with a stepped cam to relieve the pressure oin a seat 36 (similar to seat 12b of FIG. 2) when moved to the upper step 33 above tight seal step 32 to still keep a seal against the turned lip 31a of neck 30 while the pressure is relieved through line 20. This construction is well known in the radiator filler neck industry, as shown on Pages 116-117 of Glenn's Auto Repair Manual of 1967.

The use of a pressure tank for gasoline on automobiles and gasoline burning trucks and buses can reduce vapor lock problems with fuel feeding systems as vapor pressures in fuel lines will be overcome by vapor pressures in the fuel tank to minimize or eliminate such vapor lock problems. Losses of vapor in filling the fuel tank after the cap is removed can be reduced or eliminated by leading such vapors to a canister such as 21, similar to the one shown in the Hall U.S. Pat. No. Re. 26,169. Such a canister might have to be a little larger to take care of the vapors before filling a large fuel tank. Such vapors in a pressurized large almost empty fuel tank can be taken care of in some future filling stations by a suitable tight seal with the filling hose and suitable vapor absorbers at filling stations and no spill connection as used in outboard motor fuel disconnect and connect fittings.

I have illustrated my inventions in these various forms; however, many other variations maay be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

I claim:

1. In a fuel system of an internal combustion engine for capturing the vapors normally escaping from a tank containing vaporizable fuel when the tank is opened, said tank having a filler neck extending upwardly from the upper end of the tank and open at its free end for entry of fuel to refill the tank, a cap for sealing the open end of the filler neck against the escape of vapor under pressure generated by the fuel in the tank, a container having means therein for absorbing said vapors when directed thereinto, means forming with a portion of the neck a passageway leading from the interior of the tank to the interior of the container.

Manually movable valve means alternately movable, while the cap seals the filler neck opening, to block said passageway for permitting build-up of vapor pressure in the tank and for unblocking said passageway to release any vapor pressure in excess of atmospheric pressure from said tank to said container.

2. In a system according to claim 1 including means operated by the engine for purging said container.

3. In a system according to claim 1 wherein the means forming said passageway includes a flexible tube extending from said portion of the neck and the manually adjustable valve means comprises a removable clamp for collapsing the tube for blocking the passageway.

4. In a system according to claim 1 wherein the valve means is located within the neck portion for normally blocking said passageway, and means on the cap operatively associated with the valve means for operating it to unblock the passageway without unsealing the cap.

5. In a system according to claim 4 including means to purge the container by operation of said engine.

6. In a system according to claim 4 wherein the means on the cap is movable by a turning movement of the cap without breaking the seal to operate the valve means to unblock the passageway.

7. In a system according to claim 4 wherein the means on the cap is movably mounted thereon for operating the valve means to unblock the passageway.

* * * * *